(12) United States Patent
Ikeda et al.

(10) Patent No.: US 7,867,520 B2
(45) Date of Patent: Jan. 11, 2011

(54) FLAVOR IMPROVING AGENT

(75) Inventors: Kenji Ikeda, Tokyo (JP); Shuzo Tashiro, Tokyo (JP); Satoshi Hamada, Tokyo (JP); Katsuhiko Sato, Tokyo (JP)

(73) Assignee: Adeka Corporation, Tokyo (JP)

( * ) Notice: Subject to any disclaimer, the term of this patent is extended or adjusted under 35 U.S.C. 154(b) by 241 days.

(21) Appl. No.: 12/092,842

(22) PCT Filed: Jun. 20, 2007

(86) PCT No.: PCT/JP2007/062461

§ 371 (c)(1),
(2), (4) Date: May 7, 2008

(87) PCT Pub. No.: WO2007/148743

PCT Pub. Date: Dec. 27, 2007

(65) Prior Publication Data

US 2009/0238906 A1    Sep. 24, 2009

(30) Foreign Application Priority Data

| Jun. 21, 2006 | (JP) | ................................. | 2006-171940 |
|---|---|---|---|
| Jun. 21, 2006 | (JP) | ................................. | 2006-171941 |
| Jun. 21, 2006 | (JP) | ................................. | 2006-171942 |
| Jun. 21, 2006 | (JP) | ................................. | 2006-171943 |
| Jun. 21, 2006 | (JP) | ................................. | 2006-171944 |
| Jun. 21, 2006 | (JP) | ................................. | 2006-171945 |
| Aug. 4, 2006 | (JP) | ................................. | 2006-213708 |
| Aug. 4, 2006 | (JP) | ................................. | 2006-213709 |
| Aug. 4, 2006 | (JP) | ................................. | 2006-213710 |
| Aug. 4, 2006 | (JP) | ................................. | 2006-213711 |
| Aug. 4, 2006 | (JP) | ................................. | 2006-213712 |
| Aug. 4, 2006 | (JP) | ................................. | 2006-213713 |
| Jun. 18, 2007 | (JP) | ................................. | 2006-160736 |
| Jun. 18, 2007 | (JP) | ................................. | 2007-160732 |
| Jun. 18, 2007 | (JP) | ................................. | 2007-160733 |
| Jun. 18, 2007 | (JP) | ................................. | 2007-160734 |
| Jun. 18, 2007 | (JP) | ................................. | 2007-160735 |
| Jun. 18, 2007 | (JP) | ................................. | 2007-160737 |

(51) Int. Cl.
*A61K 35/20* (2006.01)

(52) U.S. Cl. ........................................... 424/535

(58) Field of Classification Search .................. None
See application file for complete search history.

(56) References Cited

U.S. PATENT DOCUMENTS

| 4,963,387 | A | 10/1990 | Nakagawa et al. | |
|---|---|---|---|---|
| 6,399,140 | B1 * | 6/2002 | Allen et al. | .................. 426/649 |
| 6,974,597 | B2 * | 12/2005 | Ohta et al. | .................. 426/590 |
| 2006/0115517 | A1 * | 6/2006 | Tsuchiya et al. | ............. 424/439 |

FOREIGN PATENT DOCUMENTS

| EP | 536612 | * | 4/1993 |
|---|---|---|---|
| EP | 1 163 852 | | 12/2001 |
| JP | 63087944 | * | 4/1988 |
| JP | 63-141561 | | 6/1988 |
| JP | 63-287460 | | 11/1988 |
| JP | 64-13968 | | 1/1989 |
| JP | 1-191659 | | 8/1989 |
| JP | 02107152 | * | 4/1990 |
| JP | 3-22959 | | 1/1991 |
| JP | 3-219838 | | 9/1991 |
| JP | 5-7474 | | 1/1993 |
| JP | 5-184326 | | 7/1993 |
| JP | 06197732 | * | 7/1994 |
| JP | 8-56583 | | 3/1996 |
| JP | 10-66540 | | 3/1998 |
| JP | 10-179077 | | 7/1998 |
| JP | 2001-245627 | | 9/2001 |
| JP | 2001-299266 | | 10/2001 |
| JP | 2002-502619 | | 1/2002 |
| JP | 2002-65177 | | 3/2002 |
| JP | 2003033135 | * | 2/2003 |
| JP | 2003-135020 | | 5/2003 |
| JP | 2005-336078 | | 12/2005 |
| SU | 1132890 | * | 1/1985 |
| WO | 00/48475 | | 8/2000 |
| WO | 01/39613 | | 6/2001 |

* cited by examiner

*Primary Examiner*—Christopher R. Tate
(74) *Attorney, Agent, or Firm*—Young & Thompson

(57) ABSTRACT

A taste improving agent containing as an active ingredient a whey mineral satisfying all the criteria (a), (b), (c), (d), and (e) below:
(a) an ash content in an solid portion of the whey mineral is 25 to 75% by mass;
(b) a calcium content in a solid portion of the whey mineral is less than 2% by mass;
(c) a calcium content in an ash portion of the whey mineral is less than 5% by mass;
(d) a lactic acid content in a solid portion of the whey mineral is 1.0% by mass or more; and
(e) a pH of an aqueous solution containing 0.1% by mass of a solid portion of the whey mineral is 6.0 to 7.5.

21 Claims, No Drawings

FLAVOR IMPROVING AGENT

TECHNICAL FIELD

The present invention relates to a taste improving agent that exerts taste improving effects such as seasoning, masking, and salt taste enhancement with an extremely small added amount without changing taste quality, basic taste, or taste balance of a food or beverage.

BACKGROUND ART

For basic tastes such as a salty taste, a bitter taste, a hot taste, a sweet taste, a sour taste, a delicious taste, and an astringent taste, there is a preferable balance among theses tastes for each food or beverage.

Conventionally, preference of a taste is determined based on a relationship between residence time in the mouth and strength of the taste: when a strong, sharp taste is felt immediately after a food is taken in the mouth, the taste is considered pungent and not to be preferable; while when a taste is spread in a good balance after a little while after taking a food in the mouth, the taste is said to be deep, or smooth or mild and tends to be preferred.

It has been very difficult, however, to reduce a pungent taste and modify such a taste into a smooth, mild and deep taste while the basic taste remains unchanged.

Accordingly, development of taste improving agents that can change a pungent taste into a smooth and deep taste and provide a well-balanced taste as a whole with an extremely small added amount, that is, so-called seasoning agents, has been conducted in various ways.

For example, a seasoning agent using bittern (for example, see Patent Document 1) and a seasoning agent using a pyroglutamate (for example, see Patent Document 2) have been proposed. However, the seasoning agent of Patent Document 1 has a problem of having a very strong bitter taste and the seasoning agent of Patent Document 2 has a problem that it is effective only for a food or beverage having a particular taste.

In addition, a balance among the tastes mentioned above may be disrupted by various factors.

For example, in food processing steps such as heat sterilization and addition of a preservative during manufacturing of a food or beverage and during storage of a food or beverage, a taste-balance disrupting taste, such as a bitter taste, an astringent taste, or a harsh taste, that is, a discordant taste, will be generated.

In such a case, processing to remove a discordant taste, such as distillation and elution, may be conducted. Since such procedures are conducted to remove trace components, however, the procedures are very cumbersome and may reduce even basic tastes of a food or beverage.

In some foods or beverages, a particular taste alone is very strong and a preferable basic taste balance thereof is sometimes disrupted.

In this case, although it might be sufficient to avoid blending a food ingredient that has the particular taste or to conduct a processing for removing the ingredient, other tastes may also be reduced and a taste balance is further destroyed.

Accordingly, various taste improving agents that can make a discordant taste to be unfelt without substantially disrupting a basic taste balance of a food or beverage having a discordant taste, or that can weaken an excessively strong particular taste of a food or beverage in which only particular taste is very strong with an extremely small added amount of a component, that is, so-called masking agents have been proposed.

For example, a polyglycerine condensed ricinoleic acid ester (See, for example, Patent Document 3), stevia extract (See, for example, Patent Document 4), dried mysids and/or krill extract (See, for example, Patent Document 5), and nontoxic salts of gluconic acid (See, for example, Patent Document 6) have been proposed. The masking agent of Patent Document 3 has, however, problems that the agent is an emulsion and thus frequently affects physical properties, and the agent per se has a bad taste. The masking agent of Patent Document 4 has problems that the agent is effective only for foods and beverages having a bitter taste and an astringent taste and its added amount is limited due to its strong sweet taste. The masking agent of Patent Document 5 has problems that the agent is effective only for foods and beverages having a bitter taste and is required to be added in a relatively large amount. The masking agent of Patent Document 6 has a problem that the agent is required to be added in a relatively large amount.

Since a salty taste, among the basic tastes described above, does not merely serve as a favorite taste but has an effect of bringing out good tastes of foods and beverages and enhancing appetite, it is very important as a taste of foods and beverages.

Salt, namely, sodium chloride, is generally used to give a salty taste to foods and beverages. Since excessive intake of sodium, a major component of sodium chloride, is a risk factor for many health-related diseases including hypertension, however, it is recommended to control the intake of sodium chloride. Various reduced salt foods and beverages with a reduced amount of sodium chloride have been thus developed and marketed. When only the amount of sodium chloride to be added is reduced, however, a salty taste, one of the basic tastes, is naturally reduced, making the taste light and losing deliciousness.

Accordingly, various studies have been made to reduce the content of sodium chloride while keeping a salty taste of a food or beverage unchanged.

The methods can be roughly classified into a method in which a sodium chloride substitute is used and a method in which a taste improving agent that enhances a salty taste, that is, a salty taste enhancer, is used.

The sodium chloride substitutes are substances having a salty taste similar to that of sodium chloride and represented by potassium chloride and alkaline metal salts of organic acids, and reduce a sodium chloride content of a food or beverage by substituting for part or all of sodium chloride used therein.

However, sodium chloride substitutes such as potassium chloride have a lighter salty taste than sodium chloride and also have an astringent taste and/or a bitter taste in addition to a salty taste. Accordingly, when an amount of sodium chloride substituted is increased, a food or beverage obtained has a lighter salty taste and suffers from a problem of changes in taste quality.

Owing to recent heightened consumers' health consciousness and inclination toward natural products, even for reduced salt foods that are basically healthy foods, the use of natural food ingredients rather than chemically synthesized ingredients has been requested for raw materials.

Under such circumstance, also for the sodium chloride substitutes, various proposals have been made to use natural food ingredients containing, for example, alkali metal salts such as bittern and a whey mineral in place of a single ingredient such as potassium chloride and alkali metal salts of organic acids, although the use of these natural food ingredients may further reduce a salty taste itself.

Particularly, since a whey mineral has such features as a mild salt taste and a low sodium content, various investigations have been made on the methods of using a whey mineral.

For example, a method in which a whey mineral itself is used as a sodium chloride substitute (See, for example, Patent Document 7), a sodium chloride substitute using a whey mineral and potassium chloride in combination (See, for example, Patent Documents 8 and 9), a sodium chloride substitute using a whey mineral, potassium chloride, and acids in combination (See, for example, Patent Document 10), a sodium chloride substitute using a whey mineral and alkali metal salts in combination (See, for example, Patent Document 11), a sodium chloride substitute using a whey mineral containing whey protein (See, for example, Patent Document 12), a sodium chloride substitute using a whey mineral obtained by filtering milk whey through a nanofiltration membrane (See, for example, Patent Document 13) and the like have been proposed.

However, since a whey mineral is a mixture of various salts and thus originally has a weak salty taste, there is a problem that a food or beverage obtained has only a weak salty taste and deliciousness thereof might be deteriorated. In addition, since a whey mineral also slightly has a bitter taste, a salty taste of a food or beverage obtained is further weakened and its taste quality is changed when the substituted amount of sodium chloride is increased.

Especially, the sodium chloride substitutes that use a whey mineral in combination with potassium chloride or alkali metal salts originally having a bitter taste or an astringent taste described in Patent Documents 8, 9, 10, and 11 have a problem that the bitter taste or the astringent taste thereof is enhanced.

Further, the sodium chloride substitutes described in Patent Document 12 and Patent Document 13 attempted to decrease a bitter taste of a whey mineral, but there is a problem that their effect is insufficient and a bitter taste is felt with an increase in the substituted amount of sodium chloride.

As described above, it was impossible to reduce a content of sodium chloride while a taste quality and a salty taste are kept by using methods that use sodium chloride substitutes.

On the other hand, salty taste enhancers are taste improving agents that have no or only light salty taste, but that have an effect of enhancing a feeling of a salty taste of sodium chloride when added in an extremely small amount to sodium chloride. With the use of a salty taste enhancer, even foods and beverages having a low sodium chloride content can have a salty taste equal to that of foods and beverages having a high sodium chloride content.

Since this method can reduce the sodium chloride content of a food or beverage without causing a large change in taste quality, a large number of substances such as capsaicin (see, for example, Patent Document 14), trehalose (see, for example, Patent Document 15), and protein hydrolysates (see, for example, Patent Document 16), and specific surfactants (see, for example, Patent Document 17) have been proposed.

However, since the effect of these salty taste enhancers to enhance a salty taste is very weak, these salty taste enhancers must be used in a large amount when a high salty taste enhancing effect is demanded on foods and beverages having a low sodium chloride content. In this case, since these salty taste enhancers have strong tastes other than a salty taste, there is a problem of causing a change in taste quality of foods and beverages. For example, the method of Patent Document 14 increases a hot taste, the method of Patent Document 15 increases a sweat taste, the method of Patent Document 16 a bitter taste, and the method of Patent Document 17 odor.

As described above, no salty taste enhancers that can achieve a sufficient effect with an extremely small amount used without changing the taste quality of foods and beverages have been obtained. In addition, no methods that can reduce a sodium chloride content while keeping the taste quality and the salty taste of drink and food products have been obtained.

Patent Document 1: Japanese Patent Laid-Open Publication No. 2003-135020

Patent Document 2: Japanese Patent Laid-Open Publication No. 2001-299266

Patent Document 3: Japanese Patent Laid-Open Publication No. 2002-65177

Patent Document 4: Japanese Patent Laid-Open Publication No. 2005-336078

Patent Document 5: Japanese Patent Laid-Open Publication No. 10-179077

Patent Document 6: WO00/48475

Patent Document 7: Japanese Patent Laid-Open Publication No. 63-141561

Patent Document 8: Japanese Patent Laid-Open Publication No. 63-287460

Patent Document 9: Japanese Patent Laid-Open Publication No. 03-022959

Patent Document 10: Japanese Patent Laid-Open Publication No. 01-191659

Patent Document 11: Japanese Patent Laid-Open Publication No. 64-013968

Patent Document 12: Japanese Patent Laid-Open Publication No. 05-007474

Patent Document 13: Japanese Patent Application Laid-Open No. 2002-502619

Patent Document 14: Japanese Patent Laid-Open Publication No. 2001-245627

Patent Document 15: Japanese Patent Laid-Open Publication No. 10-66540

Patent Document 16: WO01/039613

Patent Document 17: Japanese Patent Laid-Open Publication No. 5-184326

DISCLOSURE OF THE INVENTION

Accordingly, an object of the present invention is to provide a taste improving agent (seasoning agent) that can modify a pungent taste contained in a food or beverage into a smooth taste without changing the basic taste of the food or beverage by using an extremely small added amount and a method of improving a taste of a food or beverage (seasoning method) that can modify a pungent taste of a food or beverage into a smooth and deep taste without changing the basic taste of the food or beverage to provide a well-balanced taste as a whole.

Further, an object of the present invention is to provide a taste improving agent (masking agent) and a method of improving a taste (masking method) that can mask a discordant taste of a food or beverage or a drug and a taste that is excessively strong as a taste of a food or beverage or a drug without changing its basic taste balance with an extremely small added amount.

Further, an object of the present invention is to provide a taste improving agent (salty taste enhancer) that can exert a sufficient effect without changing the taste quality of a food or beverage using an extremely small added amount; a salt composition that has a taste quality comparable to that of sodium chloride and an enhanced salty taste; a food or beverage that has an enhanced salty taste with respect to a sodium chloride content while the taste quality of a food or beverage maintained; and a method of improving a taste of a food or beverage (a method of enhancing a salty taste) that can enhance a salty taste of a food or beverage while the taste quality of the food or beverage is maintained.

The present inventors have conducted various investigations to achieve the above objects and found that a whey mineral having a specific composition exhibits an extremely strong Seasoning Agent Effect when it is added in an extremely small amount to a food or beverage having a pungent taste.

It has been found that the whey mineral having a specific composition mentioned above exhibits an extremely strong masking effect when it is added in an extremely small amount to a food or beverage having the discordant taste or excessively strong taste.

In addition, it has been found that the whey mineral having a specific composition mentioned above exhibits an extremely strong effect of enhancing a salty taste of sodium chloride when it is added only in an extremely small amount and scarcely has a bitter taste or an astringent taste.

The present invention has been achieved based on these findings and provides a taste improving agent such as a masking agent, a seasoning agent, or a salty taste enhancer that comprises a whey mineral satisfying all the following criteria (a), (b), (c), (d), and (e):

(a) an ash content in a solid portion of the whey mineral is 25 to 75% by mass;

(b) a calcium content in a solid portion of the whey mineral is less than 2% by mass;

(c) a calcium content in an ash portion of the whey mineral is less than 5% by mass;

(d) a lactic acid content in a solid portion of the whey mineral is 1.0% by mass or more; and (e) a pH of an aqueous solution containing 0.1% by mass of a solid portion of the whey mineral is 6.0 to 7.5.

In addition, the present invention provides a method of Seasoning Agent Food or beverage, wherein the taste improving agent (seasoning agent) is added to a food or beverage having a pungent taste. The method of Seasoning Agent Food or beverage can modify a pungent taste of a food or beverage into a smooth and deep taste, and a well-balanced taste as a whole without changing the basic taste of the food or beverage.

Further, the present invention provides a method of masking a discordant taste or an excessively strong taste of a food or beverage or a drug, wherein the taste improving agent (masking agent) is added to a food or beverage or a drug.

Further, the present invention provides a salt composition comprising the taste improving agent (salty taste enhancer) and sodium chloride.

Further, the present invention provides a food or beverage using the salt composition.

Further, the present invention provides a method of enhancing a salty taste of a food or beverage, wherein the taste improving agent (salty taste enhancer) is added to a food or beverage.

BEST MODE FOR CARRYING OUT THE INVENTION

First, the whey mineral used in the taste improving agent of the present invention will be described.

A whey mineral is generally obtained by removing proteins and lactose as far as possible from a milk or whey and characterized by containing an ash of the milk at a high concentration.

Accordingly, each component of the ash is contained in a proportion similar to that in the raw material, milk or whey.

The whey mineral used in the taste improving agent of the present invention is characterized in that, unlike the whey mineral described above, the calcium content is low, the lactic acid content is high, and the pH is high.

In other words, the whey mineral used in the masking agent of the present invention satisfy the following criteria (a), (b), (c), (d), and (e).

(a) The ash content in the solid portion of the whey mineral is 25 to 75% by mass;

(b) The calcium content in the solid portion of the whey mineral is less than 2% by mass;

(c) The calcium content in the ash portion of the whey mineral is less than 5% by mass;

(d) The lactic acid content in the solid portion of the whey mineral is 1.0% by mass or more; and (e) The pH of an aqueous solution containing 0.1% by mass of the solid portion of the whey mineral is 6.0 to 7.5.

The whey mineral used in the taste improving agent of the present invention has an ash content in the solid portion of 25 to 75% by mass, and preferably 30 to 75% by mass. When the ash content in the solid portion is less than 25% by mass, the content of other organic components increases to make the taste derived from raw materials excessively strong, which is not suitable for a taste improving agent. When the content exceeds 75% by mass, a bitter taste is strong, which is not suitable for a taste improving agent.

The whey mineral used in the taste improving agent of the present invention has a calcium content in the solid portion of less than 2% by mass, preferably less than 1% by mass, and more preferably less than 0.5% by mass. When the calcium content in the solid portion is 2% by mass or more, the taste improving effect is substantially reduced and turbidity tends to occur in a food or beverage or a drug obtained. The lower limit is not particularly specified.

The whey mineral used in the taste improving agent of the present invention has a calcium content in the ash portion of less than 5% by mass, preferably less than 3% by mass, and most preferably less than 2% by mass. When the calcium content is 5% by mass or more, the taste improving effect is substantially reduced and turbidity tends to occur in a food or beverage obtained. The lower limit is not particularly specified.

Further, the whey mineral used in the taste improving agent of the present invention has a lactic acid content in the solid portion of 1.0% by mass or more, preferably 2 to 25% by mass, more preferably 3 to 15% by mass. When the lactic acid content is less than 1.0% by mass, the taste improving effect is reduced. The lactic acid content as used herein is based on data obtained by a general procedure, that is, processing a sample with perchloric acid followed by measurement with high performance liquid chromatography. Thus, the lactic acid content used herein means a total content of lactic acid including its salts such as sodium lactate, potassium lactate, calcium lactate, and the like.

The whey mineral used in the taste improving agent of the present invention has a pH of 6.0 to 7.5, and preferably 6.5 to 7.0, in a form of an aqueous solution containing the solid content at 0.1% by mass. When the pH is less than 6.0, the taste improving effect is too weak to be suitable for a taste improving agent, and when the pH exceeds 7.5, brown coloration or the like tends to occur by heating during manufacturing and use.

Then, the method of manufacturing the whey mineral having the features mentioned above will be described.

As described above, a conventional whey mineral cannot be directly used to obtain a whey mineral having a high lactic acid content and a low calcium content used in the present invention. In order to obtain the whey mineral having the above lactic acid content and the above calcium content, therefore, a method that uses acid whey obtained by using milk in which calcium content is reduced is used when the whey mineral is obtained by removing lactose and proteins from milk or whey by membrane separation and/or ion exchange then cooling, or a process to remove calcium is inserted when the whey mineral is manufactured from sweet whey. However, in terms of efficiency and cost in industrial practice, it is preferable that a step of removing calcium is inserted after the step of concentrating a mineral to a certain level, when the whey mineral is manufactured from sweet whey. The method of removing calcium used here is not particularly limited and known methods such as a precipitation method with temperature adjustment and holding and ion exchange. The ash content in the solid portion can be adjusted by adjusting the conditions of membrane treatment in nanofilter membrane separation, and pH can be adjusted by, for example, adjusting fermentation time during manufacturing cheese for obtaining sweet whey used as a starting material.

Although a method in which lactate fermentation of whey is strongly advanced, a method in which a large amount of lactic acid is used to increase an amount of lactic acid when acid whey is obtained, and the like may be considered, it is difficult for a whey mineral obtained to satisfy the pH condition described in (e). In this case, a method including a neutralization step with addition of alkali, and the like, can be used. This method is not preferable, however, since the taste quality is deteriorated.

In other words, as the whey mineral having the above characteristics, the whey mineral obtained by the following steps is preferable:

(f) a step of separating a demineralized liquid from milk or whey by membrane separation and/or ion exchange to obtain a high mineral liquid (I);

(g) a step of heat treating the high mineral liquid (I) to separate and remove a calcium-phosphate complex to obtain a high mineral liquid (II); and (h) a step of concentrating and/or drying the high mineral liquid (II) until a solid content is 20% by mass or more to obtain the whey mineral.

First, milk or whey used as a starting material in the step for obtaining the whey mineral having the above characteristics will be described.

Examples of the milk include not only cow milk but also human milk, goat milk, horse milk as well as defatted milk, processed milk and cream obtained therefrom, and any of them can be used. As the above whey, any whey such as whey obtained as a byproduct during manufacturing of cheese using the above milk, whey obtained as a byproduct during manufacturing of casein, whey obtained by ultrafiltration of milk can be used.

In addition, for the whey obtained as a byproduct during manufacturing of cheese and the whey obtained as a byproduct during manufacturing of casein, there are acid whey and sweet whey depending on the manufacturing method and both of them can be used.

In order to obtain the taste improving agent of the present invention, among the above milks and wheys, a whey obtained as a byproduct during manufacturing of cheese using cow milk or a whey obtained as a byproduct during manufacturing of casein is preferably used, a whey obtained as a byproduct during manufacturing of cheese using cow milk is more preferably used, and a sweet whey obtained as a byproduct during manufacturing of cheese using cow milk is particularly preferably used due to its especially high taste improving effect.

Then, the above steps of (f), (g), and (h) will be described.

The above milk or whey is separated into a demineralized liquid and a high mineral liquid (I) by membrane separation and/or ion exchange in the step (f).

As the method of membrane separation used here, various methods including microfiltration separation, ultrafiltration separation, nanofiltration separation, reverse osmosis separation, dialysis membrane separation are available, and as the method of ion exchange used here, electrodialysis membrane separation using a cation exchange membrane method and an anion exchange membrane method and a method using an ion exchange resin are available. One of these membrane separation methods and ion exchange can be used alone or two or more of these methods can be used in combination.

In the step (f), nanofiltration separation and/or reverse osmosis separation are preferable due to their high separation efficiency, and nanofiltration separation followed by reverse osmosis separation is more preferable.

Then, a calcium-phosphate complex is separated and removed from the high mineral liquid (I) obtained in the step (f) to obtain a high mineral solution (II) in the step (g).

In the step (g), heat treatment or ion exchange is conducted.

The method of heating in the heat treatment is not particularly limited, and both direct heating and indirect heating can be conducted.

Further, the heating temperature in the heat treatment is preferably 50 to 99° C., and more preferably 70 to 90° C., and the time to keep the temperature is preferably 2 to 60 minutes, and more preferably 15 to 25 minutes.

Since an insoluble calcium-phosphate complex is formed by the heat treatment, the complex is separated and removed to obtain a high mineral liquid (II).

Ordinary methods such as filtration and centrifugation may be used as the separation method.

As the method of ion exchange, electrodialysis membrane separation using a cation exchange membrane method and an anion exchange membrane method and a method using an ion exchange resin are available. One of these membrane separation methods and ion exchange can be used alone or two or more of these methods can be used in combination.

Further, in the step (h), the high mineral liquid (II) obtained in the step (g) is concentrated and/or dried until a solid content is 20% by mass or more, preferably 40% by mass or more, and further preferably 60 to 100% by mass to obtain a whey mineral.

Although the concentration method is not particularly limited, vacuum concentration using an evaporator is preferable, since water alone can be removed efficiently.

The drying method is not particularly limited and ordinary drying methods such as a spray-drying method and a lyophilization method can be selected appropriately.

In the step (h), it is preferable to conduct the drying process after the concentration process since water removal can be conducted efficiently.

In this case, the concentration is conducted in the concentration process until the solid content is preferably 20 to 60% by mass, and then drying is conducted until the solid content is preferably 60 to 100% by mass.

Although the whey mineral may be in any form such as a fluid form, a paste form and a powder form as long as its solid content is 20% by mass or more, a powder form is preferable since it can be well mixed with a food or beverage and hygroscopicity during storage can be prevented.

When the whey mineral is in the form of fluid or paste, the solid content is preferably 20 to 80% by mass, more preferably 40 to 70% by mass, and when it is in the form of powder, the solid content is preferably 40 to 100% by mass, and more preferably 70 to 100% by mass.

The taste improving agent of the present invention contains the whey mineral as an active ingredient. The taste improving agent of the present invention may use the whey mineral alone as it is or may use the whey mineral blended with various additives and formulated into the forms of powder, granules, tablets, liquid and the like by ordinary methods. The content of the whey mineral in the blend is preferably 1 to 100% by mass, more preferably 5 to 100% by mass, further preferably 10 to 100% by mass, further more preferably 20 to 100% by mass, and most preferably 50 to 100% by mass as a solid portion derived from the whey mineral.

Examples of the additives for a blend in the forms such as powder, granules and tablets include polysaccharide thickeners such as alginates, pectin, seaweed polysaccharides, carboxymethyl cellulose, and the like; excipients such as lactose, starch, silicon dioxide, and the like; sweeteners such as glucose, fructose, sucrose, maltose, sorbitol, stevia, and the like; anticaking agents such as silicon dioxide fine particles, magnesium carbonate, disodium hydrogen phosphate, magnesium oxide, calcium carbonate, and the like; vitamins; flavors; antioxidants; a brighteners; and the like. One or more of these are appropriately selected and used. The content of these various additives in the taste improving agent of the present invention is preferably 90% by mass or less and further preferably 50% by mass or less, although the content varies depending of the types of additives.

When the taste improving agent of the present invention is formulated in a liquid form, the blend can be obtained by dissolving or dispersing the agent in liquid. Examples of such liquid include water, ethanol, and propylene glycol. The content of the liquid in the taste improving agent of the present invention is preferably 90% by mass or less, and more preferably 50% by mass or less.

The taste improving agent of the present invention can be used to improve a taste of various foods and beverages and oral drugs.

For example, the taste improving agent of the present invention can be suitably used as a seasoning agent that can modify a pungent taste contained in a food or beverage into a smooth taste without changing the basic taste thereof using an extremely small amount.

In addition, the taste improving agent of the present invention can be suitably used as a masking agent that can mask a discordant taste of a food or beverage or a drug and a taste that is excessively strong as a taste of a foods or beverage or a drug without changing the basic taste balance with an extremely small added amount.

Examples of the discordant taste and the excessively strong taste include a bitter taste, an astringent taste, a stringent taste, a hot taste, a sour taste, and the like. The taste improving agent of the present invention is also suitable for masking a so-called canned food odor and a retort odor of heat sterilized foods such as canned foods and retort foods. Among others, the taste improving agent of the present invention is especially suitable as a bitter taste masking agent used for masking a bitter taste.

The taste improving agent of the present invention can be suitably used as a salty taste enhancer that can exhibit a sufficient effect without changing the taste quality of a food or beverage even with an extremely small added amount.

When the taste improving agent of the present invention is used as a salty taste enhancer, the taste improving agent of the present invention preferably contains a calcium ion sequestering agent in addition to the whey mineral in order to obtain a higher salty taste enhancing effect.

Examples of the calcium ion sequestering agent include sodium dihydrogen phosphate, potassium dihydrogen phosphate, sodium hydrogen phosphate, potassium hydrogen phosphate, trisodium phosphate, tripotassium phosphate, sodium tripolyphosphate, potassium tripolyphosphate, sodium pyrophosphate, potassium pyrophosphate, trisodium citrate, tripotassium citrate, sodium alginate, potassium alginate, and the like, and one or more of these can be used.

The content of the calcium ion sequestering agent is preferably 0.1 to 500 parts by mass and further preferably 1 to 100 parts by mass with respect to 100 parts by mass of the solid portion of the whey mineral, although its appropriate content differs depending on the type of substance and the type of food for which the salty taste enhancer is used.

Next, the salt composition of the present invention will be described.

The salt composition of the present invention comprises sodium chloride and the taste improving agent (salty taste enhancer) and is a seasoning that has an enhanced salty taste while maintaining a taste quality equal to that of conventional salt consisting only of sodium chloride.

The proportion of sodium chloride and the taste improving agent (salty taste enhancer) in the salt composition of the present invention is such that the amount of the solid portion of the taste improving agent (salty taste enhancer) is preferably 0.001 to 10 parts by mass, more preferably 0.01 to 5 parts by mass, and further preferably 0.05 to 3 parts by mass with respect to 100 parts by mass of sodium chloride. When the amount is less than 0.001 parts by mass, the salty taste enhancing effect is hardly obtained, and when the amount exceeds 10 parts by mass, the salty taste enhancing effect is weakened and a taste quality may also be adversely affected.

For the salt composition of the present invention, part of sodium chloride, preferably 80% by mass or less of sodium chloride, and more preferably 60% or less by mass of sodium chloride may be substituted with a known sodium chloride substitute in order to reduce the sodium chloride content.

Examples of the sodium chloride substitute are potassium chloride, alkaline metal salts of organic acids, and the like. Among them, the use of potassium chloride is preferable for the salt composition of the present invention, since potassium chloride can substitute for a larger amount of sodium chloride while maintaining an equal taste quality and salty taste.

The salt composition of the present invention may contain, in addition to sodium chloride and the salty taste enhancer, other ingredients such as flavor materials such as powdered green tea, coffee and the like, sugars, anticaking agents, vitamins, flavors, spices, colorants, antioxidants, brightening agents, and the like. The content of these other ingredients in the salt composition of the present invention is preferably 70% by mass or less, more preferably 30% by mass or less, and further preferably 10% by mass or less.

Next, the food or beverage of the present invention will be described.

The food or beverage of the present invention is a food or beverage containing the taste improving agent of the present invention as a seasoning agent or a masking agent or a food or beverage containing the salt composition of the present invention.

First, the food or beverage containing the taste improving agent of the present invention as a seasoning agent or a masking agent will be described.

The content of the taste improving agent of the present invention in the food or beverage is not particularly limited and appropriately determined depending on a food or beverage for which the agent is used or a desired degree of the taste improving effect, but the content is preferably 0.0001 to 0.5 parts by mass, more preferably 0.0005 to 0.2 parts by mass, and further preferably 0.001 to 0.1 part by mass as a solid portion of the whey mineral contained in the taste improving agent with respect to 100 parts by mass of the food or beverage. When the content is less than 0.0001 part by mass or exceeds 0.5 parts by mass, the taste improving effect is hardly observed, and when the content exceeds 0.5 parts by mass, the bitter taste of the whey mineral may be felt.

The food or beverage in the present invention is not particularly limited and includes seasoning agents such as miso (soybean paste), soy sauce, sauce for Japanese noodles, mop sauce, Japanese soup stock, sauce for pastas, dressing, mayonnaise, tomato ketchup, Worcester sauce, sauce for pork cutlet, dried seasoning powder, and the like; instant cooked foods such as Japanese clear soup powder, curry roux, white sauce, Seasoning Agent For rice dipped in green tea, soup stock cube, and the like; soups such as miso soup, Japanese clear soup, clear soup, cream soup, and the like; processed livestock products such as grilled meat, ham, sausage, and the like; processed marine products such as fish sausage, dried fish, salted fish gut, food boiled in soy sauce, chinmi (culinary delicacy), and the like; processed vegetable products such as pickles, and the like; snacks such as potato chips, rice crackers, and the like; bakery foods such as bread loaf, sweet bun, cookies, and the like; cooked foods such as boiled foods, fried foods, grilled foods, curry, stew, gratin, boiled rice, rice porridge, rice balls, and the like; noodle foods such as paste, Japanese wheat noodle, Chinese noodle, and the like; processed fat and oil foods such as margarine, shortening, fat spread, flavored fat spread, and the like; confectionery and bread materials such as flour paste, bean jam, and the like; mixed powders such as bread mix, cake mix, mix for fried foods, and the like; sweets such as chocolate, candies, jellies, ice cream, chewing gum, and the like; Japanese sweets such as bun with bean-jam filling, castilla, and the like; beverages such as coffee, coffee-flavored milk, black tea, tea with milk, soybean milk, nutrition-supplement drink, vegetable drink, vinegar drink, juice, cola, mineral water, sport drink, and the like; alcohol drinks such as beer, wine, cocktail, sour, and the like; milk and dairy products such as milk, yogurt, cheese, and the like; and others.

Next, the food or beverage containing the salt composition of the present invention will be described.

The content of the salt composition of the present invention in the above food or beverage is not particularly limited and is appropriately determined according to the food and drink for which the salt composition is used and the strength of a salty taste desired.

The food or beverage in the present invention is not particularly limited and can be a food or beverage in which salt consisting only of sodium chloride is used, and examples of the food or beverage are seasoning agents such as miso (soybean paste), soy sauce, sauce for Japanese noodles, mop sauce, Japanese soup stock, sauce for pastas, dressing, mayonnaise, tomato ketchup, Worcester sauce, sauce for pork cutlet, dried seasoning powder, herb salt, seasoned salt, and the like; instant cooked foods such as Japanese clear soup powder, curry roux, white sauce, Seasoning Agent For rice dipped in green tea, soup stock cube, and the like; soups such as miso soup, Japanese clear soup, clear soup, cream soup, and the like; processed livestock products such as ham, sausage, cheese, and the like; processed marine products such as fish sausage, dried fish, salted fish gut, food boiled in soy sauce, chinmi (culinary delicacy), and the like; processed vegetable products such as pickles; snacks such as potato chips, rice crackers; bakery foods such as bread loaf, sweet bun, cookies, and the like; cooked foods such as boiled foods, fried foods, grilled foods, curry, stew, gratin, boiled rice, rice porridge, rice balls, and the like; and others.

The salt composition of the present invention can be used for foods and beverages that contain no salt, if the foods and beverages contain salt upon eating or drinking.

The above-described food or beverage is characterized in that the taste quality of the food or beverage is maintained while a salty taste with respect to a sodium chloride content is enhanced. Further, for the salt composition of the present invention in which part of sodium chloride is substituted with potassium chloride, a salty taste with respect to a sodium chloride content can be further enhanced.

In other words, when the salt composition of the present invention is used as a substitute for salt contained in a conventional food or beverage, a food or beverage that has salty taste strength and taste quality equal to those of the conventional food or beverage can be obtained even with a reduced amount added, and the food or beverage can be used quite preferably as a reduced salt food or beverage.

Accordingly, there can be obtained a reduced salt food or beverage that has a much better taste quality than conventional reduced salt foods and beverages in which only the sodium chloride content is reduced and reduced salt foods and beverages in which part or all of sodium chloride is substituted with a sodium chloride substitute, and a reduced salt food or beverage that has a further lower sodium chloride content than conventional reduced salt foods and beverages in which the sodium chloride content is reduced by using conventional salty taste enhancers.

In the present invention, the reduced salt food or beverage has a sodium chloride content that is 10 to 90% by mass, preferably 20 to 80% by mass, and more preferably 30 to 70% by mass lower than that of ordinary foods and beverages. If the sodium chloride content is reduced by less than 10% by mass, the obtained product cannot be said as a reduced salt food or beverage, and when the content is reduced by more than 90% by mass, a salty taste of equal strength to that of ordinary foods and beverages is hardly obtained even with the salt composition of the present invention.

When the food or beverage of the present invention is a reduced salt food or beverage, the content of the salt composition of the present invention is preferably such that the sodium chloride content is reduced by 10 to 90% by mass and preferably 20 to 80% by mass as compared with that of ordinary foods and beverages for the above reason.

As a method of incorporating the salt composition of the present invention into a food or beverage, methods in which the salt composition of the present invention is added during manufacturing or upon eating can be mainly used. Specifically, a method in which sodium chloride and the taste improving agent of the present invention as a salty taste enhancer are added separately during manufacturing or upon eating; a method in which sodium chloride is added to a food or beverage containing the taste improving agent as a salty taste enhancer during manufacturing or upon eating, a method in which the taste improving agent as a salty taste enhancer is added to a food or beverage containing sodium chloride during manufacturing or upon eating, and the like may be mentioned. In other words, it is sufficient that sodium chloride and the taste improving agent as a salty taste enhancer are contained at the proportion and content described above in a food or beverage by the time of ingesting the food or beverage.

Next, the drug of the present invention will be described.

The drug of the present invention is a drug containing the taste improving agent of the present invention as a masking agent.

The content of the taste improving agent of the present invention in the drug of the present invention is not particularly limited and appropriately determined depending on a drug for which the improving agent is used or on the desired degree of the taste improving effect, but the content is preferably 0.0001 to 0.5 parts by mass, more preferably 0.0005 to 0.2 parts by mass, and further preferably 0.001 to 0.1 part by mass as a solid portion of the whey mineral contained in the taste improving agent with respect to 100 parts by mass of the drug. When the content is less than 0.0001 part by mass or exceeds 0.5 parts by mass, the taste improving effect is hardly observed, and when the content exceeds 0.5 parts by mass, the bitter taste of the whey mineral may be felt.

The drug in the present invention is not particularly limited so long as it is an oral drug and examples thereof include cold medicines, digestive medicine, medicines for headache, toothpaste, and the like.

Next, the seasoning method for a food or beverage of the present invention will be described.

The method of Seasoning Agent For a food or beverage of the present invention comprises adding the taste improving agent of the present invention described above as a seasoning agent to a food or beverage and modifying a pungent taste of a food or beverage into a smooth and deep taste while keeping the basic taste of the food or beverage to provide a well-balanced taste as a whole.

The method of addition of the taste improving agent of the present invention to a food or beverage as a seasoning agent is not particularly limited, and the taste improving agent of the present invention is added to a food or beverage of interest or raw materials thereof by any method such as mixing, dusting, spraying, dissolution and the like during processing, cooking, drinking, eating and the like the food or beverage.

The amount of the taste improving agent (seasoning agent) of the present invention added to a food or beverage is, as described above, preferably 0.0001 to 0.5 parts by mass, more preferably 0.0005 to 0.2 parts by mass, and further preferably 0.001 to 0.1 part by mass as a solid portion of the whey mineral contained in the taste improving agent (seasoning agent) with respect to 100 parts by mass of a food or beverage. When the content is less than 0.0001 parts by mass or exceeds 0.5 parts by mass, the taste improving effect is hardly observed, and when the content exceeds 0.5 parts by mass, the bitter taste of the whey mineral may be felt.

Next, the method of masking a food or beverage of the present invention and the method of masking a drug of the present invention will be described.

The method of masking a food or beverage of the present invention comprises adding of the taste improving agent of the present invention to a food or beverage as a masking agent and masking a discordant taste or an excessively strong taste of a food or beverage while keeping the basic taste of the food or beverage.

The method of addition of the taste improving agent of the present invention to a food or beverage as a masking agent is not particularly limited, and the taste improving agent of the present invention is added to a food or beverage of interest or raw materials thereof by any method such as mixing, dusting, spraying, dissolution during processing, cooking, drinking, eating and the like the food or beverage.

Further, the method of masking a drug of the present invention comprises adding the taste improving agent of the present invention to a drug as a masking agent, and masking a discordant taste or an excessively strong taste of a drug while keeping the original pharmacological efficacy of the drug.

The method of addition of the taste improving agent of the present invention to a drug as a masking agent is not particularly limited, and the taste improving agent of the present invention is added to a drug or a raw material thereof during processing, prescribing, and taking, and the like of the drug of interest by any method such as mixing, dusting, spraying, dissolution, and the like.

The amount of the taste improving agent (masking agent) of the present invention added to a food or beverage is, as described above, preferably 0.0001 to 0.5 parts by mass, more preferably 0.0005 to 0.2 parts by mass, and further preferably 0.001 to 0.1 part by mass as a solid portion of the whey mineral contained in the taste improving agent (masking agent) with respect to 100 parts by mass of a food or beverage. When the content is less than 0.0001 part by mass or exceeds 0.5 parts by mass, the masking effect is hardly observed, and when the content exceeds 0.5 parts by mass, the bitter taste of the whey mineral may be felt.

The amount of the taste improving agent (masking agent) of the present invention added to a drug is, as described above, preferably 0.0001 to 0.5 parts by mass, more preferably 0.0005 to 0.2 parts by mass, and further preferably 0.001 to 0.1 part by mass as a solid portion of the whey mineral contained in the taste improving agent (masking agent) with respect to 100 parts by mass of a drug. When the content is less than 0.0001 part by mass or exceeds 0.5 parts by mass, the masking effect is hardly observed, and when the content exceeds 0.5 parts by mass, the bitter taste of the whey mineral may be felt.

The method for enhancing a salty taste of a food or beverage according to the present invention will be described.

In the method of enhancing a salty taste of a food or beverage according to the present invention, the taste improving agent of the present invention as a salty taste enhancer is added to a food or beverage and a salty taste is enhanced while a taste quality of the food or beverage is maintained.

The added amount of the taste improving agent (salty taste enhancer) of the present invention to a food or beverage is 0.000001 to 5 parts by mass, preferably 0.00001 to 3 parts by mass, and more preferably 0.00005 to 1 part by mass as the solid portion of the whey mineral contained in the salty taste enhancer with respect to 100 parts by weigh of the food or beverage.

Since a salty taste of the best quality is obtained by the method of enhancing a salty taste of the present invention, a food or beverage to which the salty taste enhancer of the present invention is to be added preferably contains sodium chloride.

In this case, the added amount of the taste improving agent (salty taste enhancer) of the present invention to a food or beverage is preferably 0.001 to 10 parts by mass, more preferably 0.01 to 5 parts by mass, and further preferably 0.05 to 3 parts by mass as the solid portion of the whey mineral contained in the taste improving agent (salty taste enhancer) with respect to 100 parts by mass of sodium chloride contained in the food or beverage. When the added amount is less than 0.001 parts by mass or exceeds 10 parts by mass, the salty taste enhancing effect is hardly obtained, and when the amount exceeds 10 parts by mass, the taste quality of the food or beverage may be adversely affected.

As the method of adding the taste improving agent (salty taste enhancer) to a food or beverage containing sodium chloride, both a method in which the agent is added as a raw material during manufacturing of the food or beverage and a method in which the agent is added to and mixed with a food or beverage containing sodium chloride may be used.

Since the taste improving agent (salty taste enhancer) of the present invention can enhance a salty taste of a food or beverage with an extremely small amount without changing the taste quality of the food or beverage according to the method for enhancing a salty taste of a food or beverage of the present invention, a food or beverage that has salty taste strength and taste quality equal to those of conventional foods and beverages can be obtained even when the sodium chloride content of the conventional foods and beverages is reduced.

In other words, a food or beverage to which the taste improving agent (salty taste enhancer) of the present invention is to be added is preferably a reduced salt food or beverage. In this case, the food or beverage obtained is also a reduced salt food or beverage.

Specifically, when the taste improving agent of the present invention is added during manufacturing of a food or beverage, a food or beverage that has salty taste strength and taste quality equal to those of conventional foods and beverages can be obtained, although a reduction in sodium chloride content results in reduced salt foods and beverages that essentially have a light taste and lack in deliciousness.

In addition, when the taste improving agent of the present invention is added to a food or beverage, a reduced salt food or beverage that has a light taste and lacks in deliciousness due to a low sodium chloride content can be changed into a food or beverage that has salty taste strength and taste quality equal to those of foods and beverages having an ordinary sodium chloride content in spite of its low sodium chloride content.

Further, in the method of enhancing a salty taste of a food or beverage according to the present invention, a sodium chloride content can be further reduced by replacing part of sodium chloride with a salt substitute such as potassium chloride.

In the method of enhancing a salty taste of a food or beverage according to the present invention, when a food or beverage to which the taste improving agent (salty taste enhancer) of the present invention is to be added is a reduced salt food or beverage, the added amount of the taste improving agent (salty taste enhancer) of the present invention is preferably 0.001 to 10 parts by mass, more preferably 0.01 to 5 parts by mass, and further preferably 0.05 to 3 parts by mass as the solid portion of the whey mineral contained in the salty taste enhancer with respect to 100 parts by mass of sodium chloride contained in the food or beverage. When the added amount is less than 0.001 parts by mass or exceeds 10 parts by mass, the salty taste enhancing effect is hardly obtained and thus a reduced salt food or beverage that has a light taste and lacks in deliciousness may be obtained. When the amount exceeds 10 parts by mass, the taste quality of the food or beverage may be adversely affected.

EXAMPLES

Manufacturing of Whey Mineral

Manufacturing Example 1

Step (f): Sweet whey obtained as a byproduct during the manufacturing of cheese using a cow milk was used as a starting material and subjected to nanofiltration separation followed by reverse osmosis separation to separate off a demineralized liquid and obtain a high mineral liquid (I) having a solid content of 2.5% by mass.

Step (g): The high mineral liquid (I) obtained in Step (f) was subjected to heat treatment at 80° C. for 20 minutes with a combination of indirect heating and direct steam heating and the produced calcium-phosphate complex was separated and removed by a centrifuge to obtain a high mineral liquid (II).

Step (h): The high mineral liquid (II) obtained in the step (g) was concentrated with an evaporator until the solid content became 60% by mass or more and the concentrate was then dried by a spray-drying method to obtain a whey mineral having a solid content of 97% by mass (hereinbelow referred to as Whey Mineral 1).

Manufacturing Example 2

Whey Mineral 2 was obtained in a similar manner except that the treatment time was reduced by a half in the heat treatment step in the Manufacturing Example 1 above.

Manufacturing Example 3

Whey Mineral 3 was obtained in a similar manner except that sweet whey that was obtained by reducing a lactate fermentation time by 20% was used as a starting material instead of sweet whey used in the Manufacturing Example 1 above.

Manufacturing Examples 4 to 7

Further, Whey Minerals 4 to 7 having the compositions shown in Table 1 below of Manufacturing Examples 4 to 7 were obtained by adjusting the pH and the lactic acid content by adjusting the fermentation time of cheese used as a starting material, adjusting the ash content in the solid portion by adjusting the membrane treatment conditions at the time of nanofiltration separation, and adjusting the calcium content by not performing the heat treatment in the process of manufacturing a whey mineral.

Manufacturing Example 8

Whey Mineral 8 having a solid content of 40% by mass and in a form of a fluid was obtained in a similar manner except that concentration using an evaporator was conducted until the solid content reached 40% by mass in Step (h) in the Manufacturing Example 1 without performing further treatment.

Table 1 below shows (a) the ash content in the solid portion, (b) the calcium content in the solid portion, (c) the calcium content in the ash, (d) the lactic acid content in the solid portion, and (e) the pH of an aqueous solution having a solid content of 0.1% by mass.

TABLE 1

|  |  | (a) Ash content in the solid portion (% by mass) | (b) Calcium content in the solid portion (% by mass) | (c) Calcium content in the ash portion (% by mass) | (d) Lactic acid content in the solid portion (% by mass) | (e) pH of an aqueous solution having a solid content of 0.1% by mass |
|---|---|---|---|---|---|---|
| Manufacturing Example 1 | Whey Mineral 1 | 55 | 0.4 | 0.7 | 4.4 | 6.6 |
| Manufacturing Example 2 | Whey Mineral 2 | 56 | 0.9 | 1.6 | 4.1 | 6.6 |
| Manufacturing Example 3 | Whey Mineral 3 | 56 | 0.4 | 0.7 | 2.2 | 6.8 |
| Manufacturing Example 4 | Whey Mineral 4 | 55 | 2.2 | 4 | 4 | 6.6 |
| Manufacturing Example 5 | Whey Mineral 5 | 55 | 0.4 | 0.7 | 0.5 | 6.8 |
| Manufacturing Example 6 | Whey Mineral 6 | 55 | 0.4 | 0.7 | 4.8 | 5.9 |
| Manufacturing Example 7 | Whey Mineral 7 | 22 | 0.4 | 1.8 | 7.6 | 6.8 |
| Manufacturing Example 8 | Whey Mineral 8 | 55 | 0.4 | 0.7 | 4.4 | 6.6 |

Examples 1 to 9 and Comparative Examples 1 to 4 below are examples and comparative examples using the taste improving agent of the present invention as a seasoning agent.

<Manufacturing of Curry Sauce>

In a frying pan, there were finely chopped and placed 400 g of onion, 50 g of carrot, 20 g of celery, 5 g of garlic, and 10 g of ginger. The mixture was browned in 30 g of lard, Further, 30 g of wheat flour and 20 g of curry powder were added and the mixture was further fried to obtain curry roux.

At the same time, 1200 g of water was boiled and 40 g of clear soup cubes was added to the boiling water. The resultant mixture was further heated, all the curry roux was added therein, and the resultant mixture was boiled up.

Then, cooking oil, salt, 480 g of (diced) plate fried with pepper, and 100 g of grated apple were placed in the pan and the mixture was boiled thoroughly for 30 minutes to obtain curry sauce.

Example 1

The Whey Mineral 1 obtained in the Manufacturing Example 1 as it is was referred to as Seasoning Agent A of the present invention and added to the curry sauce in an amount of 0.001 part by mass with respect to 100 parts by mass of the curry sauce. The mixture was boiled thoroughly for 10 minutes to obtain Curry Sauce 1 as a food or beverage according to the present invention. A curry sauce containing no Seasoning Agent A was boiled thoroughly for 10 minutes and tasted for comparison. The Curry Sauce 1, which is a food or beverage of the present invention, had a smooth and deep taste and a balanced taste as a whole as if it was boiled thoroughly overnight as compared with the curry sauce containing no Seasoning Agent A.

Example 2

The Whey Mineral 2 obtained in the Manufacturing Example 2 as it is was referred to as Seasoning Agent B of the present invention and added to the curry sauce in an amount of 0.001 part by mass with to 100 parts by mass of the curry sauce. The mixture was boiled thoroughly for 10 minutes to obtain Curry Sauce 2 as a food or beverage according to the present invention. A curry sauce containing no Seasoning Agent B was boiled thoroughly for 10 minutes and tasted for comparison. The Curry Sauce 2, which is a food or beverage of the present invention, had a smooth and deep taste and a balanced taste as a whole as if it was boiled thoroughly overnight as compared with the curry sauce containing no Seasoning Agent B.

Example 3

The Whey Mineral 3 obtained in the Manufacturing Example 3 as it is was referred to as Seasoning Agent C of the present invention and added to the curry sauce in an amount of 0.001 part by mass with to 100 parts by mass of the curry sauce. The mixture was boiled thoroughly for 10 minutes to obtain Curry Sauce 3 as a food or beverage according to the present invention. A curry sauce containing no Seasoning Agent C was boiled thoroughly for 10 minutes and tasted for comparison. The Curry Sauce 3, which is a food or beverage according to the present invention, had a smooth and deep taste and a balanced taste as a whole as if it was boiled thoroughly overnight as compared with the curry sauce containing no Seasoning Agent C.

Comparative Example 1

The Whey Mineral 4 obtained in the Manufacturing Example 4 as it is was referred to as Seasoning Agent D of a comparative example and added to the curry sauce in an amount of 0.001 part by mass with to 100 parts by mass of the curry sauce. The mixture was boiled thoroughly for 10 minutes to obtain Curry Sauce 4 as a food or beverage of a comparative example. A curry sauce containing no Seasoning Agent D was boiled thoroughly for 10 minutes and tasted for comparison. The Curry Sauce 4, which is a food or beverage of a comparative example, had a similar taste to that of the curry sauce containing no Seasoning Agent D, and the effect obtained in Seasoning Agents A to C was not observed.

Comparative Example 2

The Whey Mineral 5 obtained in the Manufacturing Example 5 as it is was referred to as Seasoning Agent E of a comparative example and added to the curry sauce in an amount of 0.001 part by mass with to 100 parts by mass of the curry sauce. The mixture was boiled thoroughly for 10 minutes to obtain Curry Sauce 5 as a food or beverage of a comparative example. A curry sauce containing no Seasoning Agent E was boiled thoroughly for 10 minutes and tasted for comparison. The Curry Sauce 5, which is a food or beverage of a comparative example, had a similar taste to that of the curry sauce containing no Seasoning Agent E, and the effect obtained in Seasoning Agents A to C was not observed.

Comparative Example 3

The Whey Mineral 6 obtained in the Manufacturing Example 6 as it is was referred to as Seasoning Agent F of a comparative example and added to the curry sauce in an amount of 0.001 part by mass with to 100 parts by mass of the curry sauce. The mixture was boiled thoroughly for 10 minutes to obtain Curry Sauce 6 as a food or beverage of a comparative example. A curry sauce containing no Seasoning Agent F was boiled thoroughly for 10 minutes and tasted for comparison. The Curry Sauce 6, which is a food or beverage of a comparative example, had a similar taste to that of the curry sauce containing no Seasoning Agent F, and the effect obtained in Seasoning Agents A to C was not observed.

Comparative Example 4

The Whey Mineral 7 obtained in the Manufacturing Example 7 as it is was referred to as Seasoning Agent G of a comparative example and added to the curry sauce in an amount of 0.001 part by mass with to 100 parts by mass of the curry sauce. The mixture was boiled thoroughly for 10 minutes to obtain Curry Sauce 7 as a food or beverage of a comparative example. A curry sauce containing no Seasoning Agent G was boiled thoroughly for 10 minutes and tasted for comparison. The Curry Sauce 7, which is a food or beverage of a comparative example, had a similar taste to that of the curry sauce containing no Seasoning Agent G, and the effect obtained in Seasoning Agents A to C was not observed.

<Manufacturing of Coffee-Flavored Milk>

Regular coffee (mocha blend) was used to obtain a coffee liquid by a drip method. Coffee-flavored milk was obtained by mixing 50 g of the coffee liquid, 47 g of milk, and 3 g of granulated sugar.

Example 4

The Seasoning Agent A was added to the coffee-flavored milk in an amount of 0.02 parts by mass with respect to 100 parts by mass of the coffee-flavored milk, and the resultant mixture was thoroughly mixed to obtain Coffee-flavored Milk 1, which is a food or beverage of the present invention. A coffee-flavored milk containing no Seasoning Agent A and the Coffee-flavored Milk 1 were tasted for comparison. The Coffee-flavored Milk 1, which is a food or beverage of the present invention, had a smooth and deep taste and a balanced taste as a whole, and the seasoned flavor lasted in the mouth for a long time as compared with the coffee-flavored milk containing no Seasoning Agent A.

Manufacturing of Pot Instant Noodle

Example 5

In accordance with the instruction, 320 g of boiled water was poured onto a commercially available pot instant noodle (a total weight of noodle, soup, and ingredients: 77 g), and the pot was covered. After 3 minutes of waiting, the lid was removed. Over the content, 0.015 g of the Seasoning Agent A was sprinkled and the content was mixed thoroughly. The noodle was tasted. The noodle had a smooth and deep taste and a balanced taste as a whole as if the soup was boiled thoroughly for a long time as compared with the noodle containing no Seasoning Agent A.

Manufacturing of Sauce for Japanese Noodles

Example 6

A sauce for Japanese noodles was obtained by mixing 200 g of soy sauce, 20 g of commercially available additive-free bonito flavor instant soup stock, 50 g of sweet cooking rice wine, and 730 g of water bringing and the resultant mixture to boil. The Whey Mineral 8 obtained in the Manufacturing Example 8 was diluted with water so that the solid content was 10% by mass. The diluted Whey Mineral was UHT sterilized (sterilization temperature 140° C., holding time 6 seconds) and passed through a filtration membrane having a pore diameter of 0.2 µm. This solution was used as Seasoning Agent H according to the present invention.

Since the Whey Mineral 8 obtained in the Manufacturing Example 8 was found to be slightly turbid by visual inspection, absorbance was measured at a wavelength of 660 nm with a spectrophotometer. The Whey Mineral 8 had Abs. of 0.0020. On the other hand, the Seasoning Agent H of the present invention was transparent by visual inspection and its absorbance measured at a wavelength of 660 nm with a spectrophotometer was Abs. 0.0000. According to the bacterial test, it was negative in terms of general viable cell count and could be stored at ordinary temperature.

The Seasoning Agent H was added to the sauce for the Japanese noodles in an amount of 0.04 parts by mass with respect to 100 parts by mass of the sauce for the Japanese noodles, and the resultant mixture was mixed, brought to boil for only a short time, and then left standing to cool to obtain Sauce for Japanese Noodles 1 according to the present invention. The Sauce for Japanese Noodles 1 according to the present invention thus obtained had a smooth and deep taste and a well balanced taste as a whole and its seasoned taste lasted in the mouth for a long time as compared with the sauce for noodle soup that was only brought to boil for only a short time but contained no seasoning agent.

Manufacturing of Korean Pickle

Example 7

The Seasoning Agent H was added to commercially available Korean pickles in an amount of 0.04 parts by mass with respect to 100 parts by mass of the Korean pickles, and the resultant mixture was mixed thoroughly and then stored in a refrigerator overnight to obtain Korean pickles, which is a food or beverage according to the present invention. The Korean pickles according to the present invention thus obtained had a smooth and deep taste with a natural sweet taste and a well balanced taste as a whole as compared with the Korean pickles that contained no Seasoning Agent H and was only stored in a refrigerator overnight.

Manufacturing of Tomato Ketchup

Example 8

The Seasoning Agent H was added to commercially available tomato ketchup in an amount of 0.04 parts by mass with respect to 100 parts by mass of the tomato ketchup, and the mixture was thoroughly mixed and stored in a refrigerator for 1 hour to obtain tomato ketchup, which is a food or beverage according to the present invention. The tomato ketchup according to the present invention thus obtained had a smooth and deep taste with a natural sweet taste and a well balanced taste as a whole as compared with the tomato ketchup that contained no Seasoning Agent H and was only stored in a refrigerator for 1 hour.

Manufacturing of Tea with Milk

Example 9

Four commercially available tea bags of black tea (Assam) were immersed in 640 mL of boiling water for 2 minutes and 71 mL of milk was added and mixed to obtain tea with milk. The Seasoning Agent H was added to the tea with milk in an amount of 0.04 parts by mass with respect to 100 parts by mass of the tea with milk to obtain tea with milk, which is a food or beverage according to the present invention. The tea with milk according to the present invention thus obtained had a smooth and deep taste and a well-balanced taste as a whole and the seasoned taste lasted in the mouth for a long time as compared with the tea with milk containing no Seasoning Agent H.

Manufacturing of Baked Cheese Sweets

Example 10

A mass of dough was prepared by a sugar batter method using 80 parts by mass of wheat flour, 20 parts by mass of powdered cheese (Rolf Powder PP-100/Hoko Fishing Co., Ltd.), 50 parts by mass of white superior fine sugar, 46 parts by mass of shortening, 12 parts by mass of whole egg, 1 part by mass of salt, 9 parts by mass of water, 0.5 parts by mass of baking soda, 0.5 parts by mass of ammonium carbonate, and 0.3 parts by mass of the Seasoning Agent A. After shaping, the dough was baked to obtain cheese biscuit. The biscuit was tasted. The biscuit had a smooth and deep taste and a well-balanced taste as a whole as compared with cheese biscuit that was prepared without using the Seasoning Agent A.

Examples 11 to 22 and Comparative Examples 5 to 8 are examples and comparative examples using the taste improving agent of the present invention as a masking agent.

Manufacturing of Grapefruit Juice

Example 11

Grapefruit was squeezed with a juicer to obtain squeezed grapefruit juice. The Whey Mineral 1 obtained in the Manufacturing Example 1 was used as it was as a Masking Agent A according to the present invention. The Masking Agent A was added to the squeezed grapefruit juice in an amount of 0.005 parts by mass with respect to 100 parts by mass of the juice, and the mixture was thoroughly mixed to obtain Grapefruit Juice 1, which is a food or beverage according to the present invention. The Grapefruit Juice 1 according to the present invention obtained was very easy to drink, in which the basic taste balance was not altered and only a bitter taste was reduced, as compared with grapefruit juice containing no Masking Agent A.

Example 12

The Whey Mineral 2 obtained in the Manufacturing Example 2 was used as it was as a Masking Agent B according to the present invention. The Masking Agent B was added to the above grapefruit juice in an amount of 0.005 parts by mass with respect to 100 parts by mass of the grapefruit juice, and the mixture was thoroughly mixed to obtain Grapefruit Juice 2, which is a food or beverage according to the present invention. The Grapefruit Juice 2 according to the present invention obtained was very easy to drink, in which the basic taste balance was not altered and only a bitter taste was reduced as compared with grapefruit juice containing no Masking Agent B.

Example 13

The Whey Mineral 3 obtained in the Manufacturing Example 3 was used as it was as a Masking Agent C according to the present invention. The Masking Agent C was added to the above grapefruit juice in an amount of 0.005 parts by mass with respect to 100 parts by mass of the grapefruit juice, and the mixture was thoroughly mixed to obtain Grapefruit Juice 3, which is a food or beverage according to the present invention. The Grapefruit Juice 3 according to the present invention obtained was very easy to drink, in which the basic taste balance was not altered and only a bitter taste was reduced as compared with grapefruit juice containing no Masking Agent C.

Comparative Example 5

The Whey Mineral 4 obtained in the Manufacturing Example 4 as it is was referred to as a Masking Agent D of a comparative example. The Masking Agent D was added to the above grapefruit juice in an amount of 0.005 parts by mass with respect to 100 parts by mass of the grapefruit juice, and the mixture was thoroughly mixed to obtain Grapefruit Juice 4, which is a food or beverage of a comparative example. The Grapefruit Juice 4 of the comparative example had a bitter taste similar to that of the grapefruit juice containing no Masking Agent D, and the effect obtained by the Masking Agents A to C was not obtained. In addition, slight turbidity was observed.

Comparative Example 6

The Whey Mineral 5 obtained in the Manufacturing Example 5 as it is was referred to as a Masking Agent E of a comparative example. The Masking Agent E was added to the above grapefruit juice in an amount of 0.005 parts by mass with respect to 100 parts by mass of the grapefruit juice, and the mixture was thoroughly mixed to obtain Grapefruit Juice 5, which is a food or beverage of a comparative example. The Grapefruit Juice 5 of the comparative example had a bitter taste similar to that of the grapefruit juice containing no Masking Agent E, and the effect obtained by the Masking Agents A to C was not obtained.

Comparative Example 7

The Whey Mineral 6 obtained in the Manufacturing Example 6 as it is was referred to as a Masking Agent F of a comparative example. The Masking Agent F was added to the above grapefruit juice in an amount of 0.005 parts by mass with respect to 100 parts by mass of the grapefruit juice, and the mixture was thoroughly mixed to obtain Grapefruit Juice 6, which is a food or beverage of a comparative example. The Grapefruit Juice 6 of the comparative example had a bitter taste similar to that of the grapefruit juice containing no Masking Agent F, and the effect obtained by the Masking Agents A to C was not obtained.

Comparative Example 8

The Whey Mineral 7 obtained in the Manufacturing Example 7 as it is was referred to as a Masking Agent G of a comparative example. The Masking Agent G was added to the above grapefruit juice in an amount of 0.005 parts by mass with respect to 100 parts by mass of the grapefruit juice, and the mixture was thoroughly mixed to obtain Grapefruit Juice 7, which is a food or beverage of the comparative example. The Grapefruit Juice 7 of the comparative example had a bitter taste similar to that of the grapefruit juice containing no Masking Agent G, and the effect obtained by the Masking Agents A to C was not obtained.

Manufacturing of Stomachic Powder

Example 14

The Masking Agent A was added to stomachic powder (Marupi/Dainippon Sumitomo Pharma Co., Ltd.) in an amount of 0.02 parts by mass with respect to 100 parts by mass of the stomachic powder and thoroughly mixed to obtain stomachic powder, which is a drug according to the present invention. The stomachic powder according to the present invention obtained was very easy to be taken, in which the basic taste balance was not changed and only a bitter taste was reduced, as compared with the stomachic powder containing no Masking Agent A.

Manufacturing of Black Coffee

Example 15

The Masking Agent A was added to sugar-free regular black coffee (Mocha blend) in an amount of 0.005 parts by mass with respect to 100 parts by mass of the black coffee and thoroughly mixed to obtain black coffee, which is a food or beverage according to the present invention. The black coffee according to the present invention obtained was very easy to drink, in which the basic taste balance was not changed and only a bitter taste was reduced, as compared with the black coffee containing no Masking Agent A.

Manufacturing of Beer

Example 16

The Masking Agent A was added in an amount of 0.005 parts by mass to 100 parts by mass of lager beer and thoroughly mixed to obtain beer, which is a food or beverage according to the present invention. The beer according to the present invention obtained was very easy to drink, in which the basic taste balance was not changed and only a bitter taste was reduced, as compared with the beer containing no Masking Agent A.

Manufacturing of *Swertia japonica* Extract

Example 17

*Swertia japonica* (Japanese Pharmacopoeia *Swertia japonica*/Yamamoto Kanpou) was brewed by the predetermined method to obtain *Swertia japonica* extract. The Masking Agent A was added to the *Swertia japonica* extract in an amount of 0.02 parts by mass with respect to 100 parts by mass of the extract and thoroughly mixed to obtain *Swertia japonica* extract, which is a drug according to the present invention. The *Swertia japonica* extract according to the present invention obtained was very easy to be taken, in which the basic taste balance was not changed and only a bitter taste was reduced, as compared with the *Swertia japonica* containing no Masking Agent A.

Manufacturing of Vinegar Drink

Example 18

Vinegar was diluted 5 times with water to obtain a vinegar drink. The Whey Mineral 8 obtained in the Manufacturing Example 8 was diluted with water so that the solid content was 10% by mass. The diluted Whey Mineral was UHT sterilized (sterilization temperature 140° C., holding time 6 seconds) and passed through a filtration membrane having a pore diameter of 0.2 μm. This solution was used as Masking Agent H according to the present invention.

Since the Whey Mineral 8 obtained in the Manufacturing Example 8 was found to be slightly turbid by visual inspection, absorption was measured at a wavelength of 660 nm with a spectrophotometer. The Whey Mineral 8 had Abs. of 0.0020. On the other hand, the Masking Agent H of the present invention was transparent by visual inspection and its absorbance measured at a wavelength of 660 nm with a spectrophotometer was Abs. 0.0000. According to the bacterial test, it was negative in terms of general viable cell count and was storable at ordinary temperature.

The Masking Agent H was added to the vinegar drink in an amount of 0.05 parts by mass with respect to 100 parts by mass of the vinegar drink and thoroughly mixed to obtain Vinegar Drink 1, which is a food or beverage according to the present invention. The Vinegar Drink 1 according to the present invention was very drinkable, in which the basic taste balance was not changed and only a sour taste was reduced, as compared with the vinegar drink containing no Masking Agent H.

Manufacturing of Orange Soaked in Syrup

Example 19

A can of orange soaked in syrup (solid content: 55%) was opened, and the Masking Agent A was added in an amount of 0.002 parts by mass with respect to 100 parts by mass of the orange soaked in syrup and thoroughly mixed to obtain Orange Soaked in Syrup, which is a food or beverage according to the present invention. The orange soaked in syrup according to the present invention obtained was very easy to eat, in which the basic taste balance was not changed and only a distinctive processing odor of canned food was reduced, as compared with the canned orange soaked in syrup containing no Masking Agent A.

Manufacturing of Soybean Milk

Example 20

The Masking Agent H was added to soybean milk (Delicious Plain Soybean Milk/Kibun Food Inc.) in an amount of 0.2 parts by mass with respect to 100 parts by mass of the soybean milk and thoroughly mixed to obtain soybean milk, which is a food or beverage according to the present invention. The soybean milk according to the present invention obtained was very easy to drink, in which the basic taste balance was not change and only a bean odor was reduced, as compared with the soybean milk containing no Masking Agent H.

Manufacturing of Sport Drink

Example 21

To 100 mL of water, 4 mg of magnesium chloride, 105 mg of sodium chloride, and 30 mg of potassium chloride were added and then 5.0 g of liquid sugar and 1 mg of grapefruit flavor were added, and the mixture was thoroughly mixed to obtain sport drink. The Masking Agent H was added to the sport drink in an amount of 0.02 parts by mass with respect to 100 parts by mass of the sport drink and thoroughly mixed to obtain a sport drink, which is a food or beverage according to the present invention. The sport drink according to the present invention obtained was very easy to drink, in which the basic taste balance was not changed and only a stringent taste was reduced, as compared with the sport drink containing no Masking Agent H.

Manufacturing of Plain Yogurt

Example 22

The Masking Agent A was added to plain yogurt in an amount of 0.02 parts by mass with respect to 100 parts by mass of the plain yogurt and thoroughly mixed to obtain plain yogurt, which is a food or beverage according to the present invention. The plain yogurt according to the present invention obtained was easy to eat, in which only a sour taste was reduced, as compared with the plain yogurt containing no Masking Agent A.

Experimental Example 1, Examples 23 to 26, and Comparative Examples 9 to 13 below are examples and comparative examples using the taste improving agent of the present invention as a salty taste enhancer.

Manufacture of Salt Composition and Test for Salty Taste Enhancer

Experimental Example 1

Each of the Whey Minerals 1 to 7 was added in amounts of 0.002 parts by mass, 0.01 parts by mass, 0.1 parts by mass, 1 parts by mass, 10 parts by mass, and 20 parts by mass with respect to 100 parts by mass of sodium chloride and mixed to manufacture salt compositions, and the salt compositions were evaluated for their salty taste strength and taste quality as described below.

<Methods of Evaluation of Salty Taste Strength and Taste Quality>

Nine panels were requested to lick the salt compositions obtained in Experimental Example 1 above and salt consisting of 100% by mass of sodium chloride as a control and to evaluate the salty taste strength and taste quality in 4 grades according to the Panel Evaluation Criteria shown below. A total score obtained was evaluated in 5 grades according to the <Evaluation Criteria> below. The results are shown in Tables 2 and 3.

| <Panel Evaluation Criteria for Salty Taste Strength> | |
|---|---|
| Salty taste that is clearly enhanced as compared with a control is felt | 2 points |
| Salty taste that is slightly enhanced as compared with a control is felt | 1 point |
| Salty taste equal to that of a control is felt | 0 point |
| Salty taste that is slightly weaker than that of a control is felt | −1 point |
| <Panel Evaluation Criteria for Quality of Taste> | |
| No taste other than sodium chloride is felt | 2 points |
| Taste other than sodium chloride is felt, but there is no strange feeling as a salty taste | 1 point |
| Taste other than sodium chloride is felt and there is a strange feeling as a salty taste | 0 point |
| There is an intolerable strange feeling | −1 point |

<Evaluation Criteria>

Very good: A total score of 9 panels is 15 to 18 points.

Good: A total score of 9 panels is 9 to 14 points.

Do: A total score of 9 panels is 5 to 8 points

Poor: A total score of 9 panels is 0 to 4 points

Very poor: A total score of 9 panels is less than 0 point.

TABLE 2

Results of Evaluation of Salty Taste Strength

| Added amount as a whey mineral with respect to 100 parts by mass of salt (parts by mass) | Added amount as a solid portion of a whey mineral with respect to 100 parts by mass of salt (parts by mass) | Whey mineral | | | | | | |
|---|---|---|---|---|---|---|---|---|
| | | 1 | 2 | 3 | 4 | 5 | 6 | 7 |
| 0.002 | 0.002 | Good | Good | Good | Poor | Poor | Poor | Poor |
| 0.01 | 0.01 | Very good | Good | Good | Poor | Poor | Poor | Poor |
| 0.1 | 0.10 | Very good | Very good | Very good | Do | Do | Poor | Poor |
| 1 | 0.97 | Very good | Very good | Very good | Do | Do | Do | Do |
| 10 | 9.7 | Good | Good | Good | Poor | Do | Poor | Poor |
| 20 | 19.4 | Poor | Poor | Poor | Poor | Poor | Poor | Poor |

TABLE 3

Results of Evaluation of Taste Quality

| Added amount as a whey mineral with respect to 100 parts by mass of salt (parts by mass) | Added amount as a solid content of a whey mineral with respect to 100 parts by mass of salt (parts by mass) | Whey mineral | | | | | | |
|---|---|---|---|---|---|---|---|---|
| | | 1 | 2 | 3 | 4 | 5 | 6 | 7 |
| 0.002 | 0.002 | Very good | Very good | Very good | Very good | Very good | Very good | Very good |
| 0.01 | 0.01 | Very good | Very good | Very good | Very good | Very good | Very good | Very good |
| 0.1 | 0.10 | Very good | Very good | Very good | Very good | Very good | Good | Good |
| 1 | 0.97 | Very good | Good | Good | Good | Good | Do | Poor |
| 10 | 9.7 | Good | Good | Good | Poor | Poor | Poor | Poor |
| 20 | 19.4 | Very poor | Very poor | Very poor | Very poor | Very poor | Very poor | Very poor |

The results described above show that Whey Minerals 1 to 3 which are the whey mineral satisfying all the conditions of: (a) the ash content in the solid portion of the whey mineral is 25 to 75% by mass; (b) the calcium content in the solid portion of the whey mineral is less than 2% by mass; (c) the calcium content in the ash of the whey mineral is less than 5% by mass; (d) the lactic acid content in the solid portion of the whey mineral is 1.0% by mass or more; and (e) the pH of an aqueous solution containing 0.1% by mass of a solid portion of the whey mineral is 6.0 to 7.5 exhibited the salty taste enhancing effect at the added amounts of the whey mineral of 0.002 to 10 parts by mass as a solid portion with respect to 100 parts by mass of sodium chloride, but at the added amounts exceeding 10 parts by mass, they did not exhibit the salty taste enhancing effect, so that the salty taste was almost the same level of that obtained by sodium chloride. It is also shown that when the added amount exceeded 10 parts by mass, tastes other than a salty taste were felt, a disagreeable feeling as a salty taste appeared, and an unusual taste was felt.

In other words, it is shown that the whey mineral satisfying all the conditions of (a), (b), (c), (d), and (e) can be used very suitably as a salty taste enhancer, although it is unsuitable as a sodium chloride substitute in terms of giving an unusual taste.

On the contrary, the Whey Mineral 4 whose calcium content was outside the range of the conditions (b) and (c); the Whey Mineral 5 whose lactic acid content was outside the range of the condition (d); the Whey Mineral 6 whose pH was outside the range of the condition (e); and the Whey Mineral 7 whose ash content was outside the range of the condition (a) did not exhibit the salty taste enhancing effect. Especially, the Whey Mineral 6 whose pH was outside the range of the condition and the Whey Mineral 7 whose ash content was outside the range of the condition tended to give a bitter taste and were not favorable.

Salt Composition and Manufacturing and Evaluation of Food or Beverage

Example 23

The Whey Mineral 1 obtained in the Manufacturing Example 1 as it is was referred to as Salty Taste Enhancer A. Subsequently, the Salty Taste Enhancer A was added to sodium chloride in an amount of 2 parts by mass with respect to 100 parts by mass of sodium chloride and thoroughly mixed to obtain Salt Composition A according to the present invention. In addition, the Salt Composition A according to the present invention was used to manufacture Cream Soup 1 according to the following blend that had a sodium chloride content of 0.91% by mass and contained 1.5 parts by mass of the Whey Mineral 1 obtained in the Manufacturing Example 1 as a solid portion with respect to 100 parts by mass of sodium chloride. At the same time, Cream Soup 2 having a sodium chloride content of 0.93% by mass was manufactured using the same method and blend as in the Example 23, except that salt consisting of 100% by mass of sodium chloride was used and no Whey Mineral 1 was used, and used as a control. These 2 types of cream soup were tasted for comparison. The Cream Soup 1, which is a food or beverage according to the present invention, had a clearly stronger salty taste with no unusual taste as compared with the Cream Soup 2 containing no salty taste enhancer and was the soup in which only a salty taste was enhanced without changing the taste quality.

<Blend of Cream Soup>

30 parts by mass of sweet corn (sodium chloride content of 0.5% by mass), 5 parts by mass of milk, 5 parts by mass of defatted milk (sodium chloride content of 1.5% by mass), 1 part by mass of salt-free butter, 0.7 parts by mass of Salt Composition A, 1 part by mass of soft wheat flour, 1 part by mass of gelatinized starch, 0.1 part by mass of white pepper, and 56.2 parts by mass of water.

Example 24

Cream Soup 3 that had a sodium chloride content of 0.72% by mass and contained 1.4 parts by mass of the Whey Mineral obtained in the Manufacturing Example 1 as a solid portion with respect to 100 parts by mass of sodium chloride was manufactured as a reduced salt food or beverage having a sodium chloride content reduced by 21% by mass from the usual sodium chloride content using the blend and manufacturing method similar to those in Example 23, except that the added amount of the Salt Composition A in the blend of Cream Soup in Example 23 was changed from 0.7 parts by mass to 0.5 parts by mass. As in Example 23, the Cream Soup 3 was tasted in comparison with the Cream Soup 2. The Cream Soup 3, which is a reduced salt food or beverage according to the present invention, had a similar level of a salty taste and a similar taste quality to those of the Cream Soup 2 that had an ordinary sodium chloride content.

Example 25

Cream Soup 4 that had a sodium chloride content of 0.47% by mass and contained 2.1 parts by mass of the Whey Mineral 1 obtained in the Manufacturing Example 1 as a solid portion with respect to 100 parts by mass of sodium chloride and that is a food or beverage according to the present invention was manufactured using the blend and manufacturing method similar to those in Example 24, except that Salt Composition B containing 50 parts by mass of sodium chloride, 50 parts by mass of potassium chloride, and 2 parts by mass of the Salty Taste Enhancer A was used in place of the Salt Composition A in the Example 24. As in Example 23, Cream Soup 4 and Cream Soup 2 were tasted for comparison. The Cream Soup 4, which is a reduced salt food or beverage according to the present invention, had a similar level of a salty taste and a similar taste quality to those of the Cream Soup 2 that had an ordinary sodium chloride content.

Example 26

50 parts by mass of the Whey Mineral 1 obtained in the Manufacturing Example 1 was mixed with 50 parts by mass of sodium dihydrogen phosphate dihydrate to obtain Salty Taste Enhancer B according to the present invention. Subsequently, 4 parts by mass of the Salty Taste Enhancer B was added to 100 parts by mass of sodium chloride and thoroughly mixed to obtain Salt Composition C according to the present invention. Cream Soup 5 that had a sodium chloride content of 0.72% by mass and contained 1.4 parts by mass of the Whey Mineral 1 obtained in the Manufacturing Example 1 as a solid portion with respect to 100 parts by mass of sodium chloride and that is a food or beverage according to the present invention was manufactured using the blend and manufacturing method as in Example 24, except that the Salt Composition C according to the present invention was used. As in Example 23, Cream Soup 5 and Cream Soup 2 were tasted for comparison. The Cream Soup 5, which is a reduced salt food or beverage according to the present invention, had a similar level of salty taste and a similar taste quality to those of the Cream Soup 2 that had an ordinary sodium chloride content.

Comparative Example 9

Salt Composition D was obtained by thoroughly mixing 2 parts by mass of the Whey Mineral 4 obtained in the Manufacturing Example 4 and 100 parts by mass of sodium chloride. Cream Soup 6 that had a sodium chloride content of 0.72% by mass and contained 1.4 parts by mass of the Whey Mineral 4 obtained in the Manufacturing Example 4 as a solid portion with respect to 100 parts by mass of sodium chloride and that is a reduced salt food or beverage of a comparative example was manufactured using the blend and manufacturing method similar to those in Example 24, except that the Salt Composition D was used. As in the Example 23, Cream Soup 6 and Cream Soup 2 were tasted for comparison. The Cream Soup 6, which is a reduced salt food or beverage of a comparative example, had a clearly weaker salty taste and poorer taste quality such as a feeling of a slightly bitter taste as compared with the Cream Soup 2 that had an ordinary sodium chloride content.

Comparative Example 10

Salt Composition E was obtained by thoroughly mixing 2 parts by mass of the Whey Mineral 5 obtained in the Manufacturing Example 5 and 100 parts by mass of sodium chloride. Cream Soup 7 that had a sodium chloride content of 0.72% by mass and contained 1.4 parts by mass of the Whey Mineral 5 obtained in the Manufacturing Example 5 as a solid portion with respect to 100 parts by mass of sodium chloride and that is a reduced salt food or beverage of a comparative example was manufactured using the blend and manufacturing method as in Example 24, except that the Salt Composition E was used. As in the Example 23, Cream Soup 7 and Cream Soup 2 were tasted for comparison. The Cream Soup 7, which is a reduced salt food or beverage of a comparative example, had a clearly weaker salty taste and poorer taste quality such as a feeling of a slightly bitter taste as compared with the Cream Soup 2 that had an ordinary sodium chloride content.

Comparative Example 11

2 parts by mass of the Whey Mineral 6 obtained in the Manufacturing Example 6 was added to 100 parts by mass of sodium chloride and thoroughly mixed to obtain Salt Composition F. Cream Soup 8 that had a sodium chloride content of 0.72% by mass and contained 1.4 parts by mass of the Whey Mineral 6 obtained in the Manufacturing Example 6 as a solid portion with respect to 100 parts by mass of sodium chloride and that is a reduced salt food or beverage of a comparative example was manufactured using the blend and manufacturing method similar to those in Example 24, except that the Salt Composition F was used. As in the Example 23, Cream Soup 8 and Cream Soup 2 were tasted for comparison. The Cream Soup 8, which is a reduced salt food or beverage of a comparative example, had a clearly weaker salty taste and poorer taste quality such as a feeling of a slightly bitter taste as compared with the Cream Soup 2 that had an ordinary sodium chloride content.

Comparative Example 12

Salt Composition G was obtained by thoroughly mixing 2 parts by mass of the Whey Mineral 7 obtained in the Manufacturing Example 7 and 100 parts by mass of sodium chloride. Cream Soup 9 that had a sodium chloride content of 0.72% by mass and contained 1.4 parts by mass of the Whey Mineral 7 obtained in the Manufacturing Example 7 as a solid portion with respect to 100 parts by mass of sodium chloride and that is a reduced salt food or beverage of a comparative example was manufactured in a similar blend and manufacturing methods to those in Example 24, except that the Salt Composition G was used. As in the Example 23, Cream Soup 9 and Cream Soup 2 were tasted for comparison. The Cream Soup 9, which is a reduced salt food or beverage of a comparative example, had a clearly weaker salty taste and poorer taste quality such as a feeling of a slightly bitter taste as compared with the Cream Soup 2 that had an ordinary sodium chloride content.

Example 27

The Whey Mineral 8 obtained in the Manufacturing Example 8 was diluted in water so that the solid content was 10% by mass. The diluted Whey Mineral 8 was UHT sterilized (sterilization temperature 140° C., holding time 6 seconds) and passed through a filtration membrane having a pore diameter of 0.2 μm to obtain a liquid formulation, which had a solid content derived from the whey mineral of 10% by mass, was transparent and was storable at room temperature. This was referred to as Salty Taste Enhancer C.

Since the Whey Mineral 8 obtained in the Manufacturing Example 8 was found to be slightly turbid by visual inspection, its absorption was measured at a wavelength of 660 nm with a spectrophotometer. The Whey Mineral 8 had Abs. of 0.0020. On the other hand, the Salty Taste Enhancer C of the present invention was transparent by visual inspection and its absorption measured at a wavelength of 660 nm with a spectrophotometer was Abs. 0.0000. According to the bacterial test, it was negative in terms of general viable cell count and was storable at room temperature.

Subsequently, 80 parts by mass of sodium chloride, 8 parts by mass of the Salty Taste Enhancer C, 10 parts by mass of sodium L-glutamate and 2 parts by mass of corn start were mixed and the mixture was wet-granulated to obtain Salt Composition H according to the present invention that contained 1 part by mass of the whey mineral as a solid portion with respect to 100 parts by mass of sodium chloride. This salt composition was mixed with black sesames at a mass ratio of 20:80 to obtain Dried Seasoning Powder 1, which is a food or beverage according to the present invention. At the same time, Dried Seasoning Powder 2 was prepared using the similar blend and manufacturing method, except that 8 parts by mass of water was used in place of the Salty Taste Enhancer C, and used as a control. These 2 types of Dried Seasoning Powder were tasted for comparison. The Dried Seasoning Powder 1, which is a food or beverage according to the present invention, had a clearly stronger salty taste than the Dried Seasoning Powder 2 containing no salty taste enhancer and gave no strange feeling. Accordingly, a salty taste was enhanced without causing a change in taste quality.

Example 28

A mixture was obtained by mixing 40 parts by mass of sodium chloride, 1 parts by mass of the Salty Taste Enhancer A used in the Example 23, 20 parts by mass of sodium L-glutamate, 20 parts by mass of granulated sugar, 15 parts by mass of corn starch, 3 parts by mass of powdered green tea, and 1 part by mass of powdered kelp, and the mixture was extruded and granulated to obtain Salt Composition 1 according to the present invention that contained 2.4 parts by mass of the whey mineral as a solid with respect to 100 parts by mass of sodium chloride. To 100 parts by mass of the Salt Composition I were added 40 parts by mass of cubic rice cracker and 3 parts by mass of dried layer seaweed and the mixture was mixed to obtain Seasoning Agent For Rice Dipped in Green Tea 1, which is a food or beverage according to the present invention. At the same time, Seasoning Agent For Rice Dipped in Green Tea 2 was manufactured using a similar blend and manufacturing method, except that no Salty Taste Enhancer A was used, to serve as a control. These 2 types of Seasoning Agent For Rice Dipped in Green Tea were used to prepare boiled rice dipped in green tea and 2 types of the boiled rice dipped in green tea were tasted for comparison. The boiled rice dipped in green tea prepared with the Seasoning Agent For Rice Dipped in Green Tea 1 according to the present invention had a clearly stronger salty taste than the boiled rice dipped in green tea prepared with the Seasoning Agent For Rice Dipped in Green Tea 2 containing no Salty Taste Enhancer A and had no strange feeling. Accordingly, a salty taste was enhanced without causing a change in taste quality.

Example 29

Potato was sliced and deeply fried in rapeseed oil to prepare a fried product, and 100 parts by mass of the fried product and 1 part by mass of the Salt Composition B obtained in Example 25 were placed in a bag and mixed by shaking to attach the Salt Composition B on the fried product to produce Potato Chip 1, which is a reduced salt food or beverage according to the present invention. At the same time, Potato Chip 2 was manufactured using a similar blend and manufacturing method, except that salt consisting of 100% by mass of sodium chloride was used in place of the Salt Composition B, to serve as a control. These 2 types of potato chip were tasted for comparison. While Potato Chip 2 had a weak salty taste and gave a slight taste, Potato Chip 1, which is a reduced salt food or beverage according to the present invention, had a clearly stronger salty taste than the Potato Chip 2 and had no strange feeling. Accordingly, a salty taste was enhanced without causing a change in taste quality.

Example 30

Ramen Soup 1 was prepared by adding 94.7 parts by mass of hot water to 5 parts by mass of Chinese soup stock (Honkaku Chuka-no-moto/NS Foods Co., Ltd.) and 0.3 parts by mass of the Salt Composition A used in Example 23, which is a reduced salt food or beverage according to the present invention. At the same time, Ramen Soup 2 was manufactured using a similar blend and manufacturing method, expect that 0.5 parts by mass of salt consisting of 100% by mass of sodium chloride was used in place of 0.3 parts by mass of the Salt Composition A, to serve as a control. These 2 types of ramen soup were tasted for comparison. The Ramen Soup 1, which is a reduced salt food according to the present invention, had salty taste strength and taste quality almost equal to those of the Ramen Soup 2 having an ordinary sodium chloride content.

Example 31

To 100 parts by mass of polished rice was added 0.5 parts by mass of the Salt Composition A used in Example 23, water was then added to the mixture, and the mixture was boiled to prepare Salty Rice 1, which is a reduced salt food or beverage according to the present invention. At the same time, Salty Rice 2 was prepared using a similar blend and manufacturing method, except that 0.9 parts by mass of salt consisting of 100% by mass of sodium chloride was used in place of 0.5 parts by mass of the Salt Composition A, to serve as a control. These 2 types of salty rice were used to prepare rice balls and the rice balls were tasted for comparison. The rice balls prepared from the Salty Rice 1 according to the present invention had salty taste strength and taste quality almost equal to those of the rice balls prepared from the Salty Rice 2 having an ordinary sodium chloride content.

Method of Enhancing Salty Taste of Food or Beverage and Evaluation

Example 32

There was added 0.2 parts by mass of the Salty Taste Enhancer A used in Example 23 (2.5 parts by mass of the whey mineral as a solid portion with respect to 100 parts by mass of salt) to 100 parts by mass of reduced salt soy sauce (Reduced Salt soy sauce/Kikkoman Co., Ltd., sodium chloride content: 8.11% by mass), which is a reduced salt food or beverage, and the mixture was thoroughly mixed to manufacture Reduced Salt Soy Sauce 1, which is a reduced salt food or beverage according to the present invention. At the same time, soy sauce having an ordinary sodium chloride content (sodium chloride content: 15% by mass) was prepared. These 2 types of soy sauce were tasted for comparison. The Reduced Salt Soy Sauce 1 according to the present invention had salty taste strength and taste quality almost equal to those of the soy sauce having an ordinary sodium chloride content.

Example 33

Reduced Salt Soy Sauce 2, which is a reduced salt soy sauce according to the present invention, was manufactured by using the blend and manufacturing method similar to those in Example 32, except that the Salty Taste Enhancer B used in Example 26 was used in place of the Salty Taste Enhancer A. At the same time, soy sauce having an ordinary sodium chloride content (sodium chloride content: 15% by mass) was prepared. These 2 types of soy sauce were tasted for comparison. The Reduced Salt Soy Sauce 2, which is a reduced salt food or beverage according to the present invention, had the salty taste strength and taste quality closer to those of the soy sauce having an ordinary sodium chloride content than the Reduced Salt Soy Sauce 1 obtained in Example 32.

Comparative Example 13

Reduced Salt Soy Sauce 3, which is a reduced salt food or beverage of Comparative Example 13, according to the present invention, was manufactured using a similar blend and manufacturing method to those in Example 32, except that the Whey Mineral 4 was used in place of the Salty Taste Enhancer A. At the same time, soy sauce having an ordinary sodium chloride content (sodium chloride content: 15% by mass) was prepared. These 2 types of soy sauce were tasted for comparison. The Reduced Salt Soy Sauce 3, which is a reduced salt food or beverage of a comparative example, had a clearly weak salty taste and poorer taste quality such as feeling of a slightly bitter taste as compared with the soy sauce having an ordinary sodium chloride content. It was slightly turbid.

Example 34

There was added 0.18 parts by mass of the Salty Taste Enhancer A (3 parts by mass of the whey mineral as a solid portion with respect to 100 parts by mass of salt) used in Example 23 to a reduced salt Japanese pickle seasoning (Reduced Salt Japanese Pickle Seasoning with Mild Taste/Ebara Foods Industry Co., Inc., sodium chloride content: 5.7% by mass), which is a reduced salt food or beverage, and the mixture was mixed thoroughly to manufacture Reduced Salt Japanese Pickle Seasoning 1, which is a reduced salt food or beverage according to the present invention. Japanese pickle Seasoning Agent Having an ordinary sodium chloride content (sodium chloride content: 8.2% by mass; Japanese Pickle Seasoning Agent Ebara Foods Industry Co., Inc.; sodium chloride content: 8.2% by mass) was prepared. These 2 types of Japanese pickle seasoning were used to pickle vegetables and the pickled vegetables were tasted for comparison. The vegetables pickled with the Reduced Salt Japanese Pickle Seasoning 1, which is a reduced salt food or beverage according to the present invention, had salty taste strength and taste quality almost equal to those pickled with the Japanese pickle Seasoning Agent Having an ordinary sodium chloride content.

Example 35

There was added 0.4 parts by mass of the Salty Taste Enhancer A (4 parts by mass of the whey mineral as a solid portion with respect to 100 parts by mass of salt) used in Example 23 to 100 parts by mass of reduced salt soybean paste (Shinshu Low-salt Mix Soybean Paste, Miyasaka Brewing Company, Ltd., sodium chloride content: 9.8% by mass), which is a reduced salt food or beverage, and the mixture was mixed thoroughly to manufacture Reduced Salt Soybean Paste 1, which is a reduced salt food or beverage according to the present invention. Soybean paste having an ordinary sodium chloride content (sodium chloride content: 12.2% by mass) was prepared. These 2 types of soybean paste were used to prepare miso (soybean paste) soups and these soups were tasted for comparison. The miso soup prepared with the Reduced Salt Soybean Paste 1, which is a reduced salt food or beverage according to the present invention, had salty taste strength and taste quality almost equal to those of the miso soup having an ordinary sodium chloride content.

Example 36

There was added 0.9 parts by mass of the Salty Taste Enhancer C obtained in Example 27 (2 parts by mass of the whey mineral as a solid portion with respect to 100 parts by mass of salt) to 100 parts by mass of reduced salt Worcester sauce (Bull-Dog 50% Salt Reduced Worcester Sauce/Bulldog Sauce Co., Ltd., sodium chloride content: 4.2% by mass), which is a reduced salt food or beverage, and the mixture was mixed thoroughly to manufacture Reduced Salt Worcester Sauce 1, which is a reduced salt food or beverage according to the present invention. Worcester sauce having an ordinary sodium chloride content (sodium chloride content: 8.4% by mass) was prepared. These 2 types of sauce were tasted for comparison. The Worcester Sauce 1, which is a reduced salt food or beverage according to the present invention, had salty taste strength and taste quality almost equal to those of the Worcester sauce having an ordinary sodium chloride content.

INDUSTRIAL APPLICABILITY

The taste improving agent of the present invention as a seasoning agent can modify a pungent taste contained in a food or beverage into a smooth and deep taste without changing the basic taste of the food or beverage using an extremely small added amount.

The method of seasoning according to the present invention can modify a pungent taste of a food or beverage into a smooth and deep taste without changing the basic taste of the food or beverage to provide a well-balanced taste as a whole.

The Seasoning Agent Effect according to the present invention is more effective and the resulting seasoned taste lasts longer in the mouth for foods and beverage having a higher water content.

The taste improving agent according to the present invention as a masking agent can mask a discordant taste or an excessively strong taste contained in a food or beverage and a drug without changing the basic taste balance with an extremely small added amount.

Further, the method of masking according to the present invention can mask a discordant taste or an excessively strong taste contained in a food or beverage or a drug without changing the basic taste balance.

The salty taste enhancer according to the present invention can, as a salty taste enhancer, enhance a salty taste without changing taste quality of a food or beverage even used at an extremely small amount.

Further, the salt composition according to the present invention has a taste quality equal to that of sodium chloride and an enhanced salty taste.

Further, the food or beverage according to the present invention can be preferably used as a reduced salt food or beverage that has both salty and delicious taste.

Further, according to the method for enhancing a salty taste of a food or beverage according to the present invention, the salty taste of a food or beverage can be enhanced without changing the taste quality with an extremely small added amount, whereby a reduced salt food or beverage that has both salty and delicious taste can be easily obtained.

The invention claimed is:

1. A taste improving agent comprising as an active ingredient a whey mineral satisfying all the criteria (a), (b), (c), (d), and (e) below:
    (a) an ash content in a solid portion of the whey mineral of 25 to 75% by mass;
    (b) a calcium content in a solid portion of the whey mineral of less than 0.5% by mass;
    (c) a calcium content in an ash portion of the whey mineral of less than 5% by mass;
    (d) a lactic acid content in a solid portion of the whey mineral of 1.0% by mass or more; and
    (e) a pH of an aqueous solution containing 0.1% by mass of a solid portion of the whey mineral of 6.0 to 7.5.

2. The taste improving agent according to claim 1, wherein the whey mineral is obtained by the following steps of:
    (f) separating a demineralized liquid from milk or whey by membrane separation and/or ion exchange to obtain a high mineral liquid (I);
    (g) separating and removing a calcium-phosphate complex from the high mineral liquid (I) to obtain a high mineral liquid (II); and
    (h) concentrating and/or drying the high mineral liquid (II) until a solid content is 20% by mass or more.

3. The taste improving agent according to claim 1 characterized by being a seasoning agent.

4. The taste improving agent according to claim 1 characterized by being a masking agent.

5. The taste improving agent according to claim 4 characterized by being a bitter taste masking agent.

6. The taste improving agent according to claim 1 characterized by being a salty taste enhancer.

7. A salt composition comprising sodium chloride and the salty taste enhancer according to claim 6.

8. The salt composition according to claim 7 further comprising potassium chloride.

9. A food or beverage comprising the seasoning agent according to claim 3.

10. A food or beverage comprising the masking agent according to claim 4.

11. An oral drug comprising the masking agent according to claim 4.

12. A food or beverage comprising the salt composition according to claim 7.

13. The food or beverage according to claim 12 characterized by being a reduced salt food or beverage.

14. A method of seasoning a food or beverage, comprising adding the seasoning agent according to claim 3 to a food or beverage.

15. A method of masking a food or beverage, comprising adding the masking agent according to claim 4 to a food or beverage.

16. A method of masking an oral drug, comprising adding the masking agent according to claim 4 to an oral drug.

17. A method of enhancing a salty taste of a food or beverage, comprising adding the salty taste enhancer according to claim 6 to a food or beverage.

18. The method of enhancing a salty taste of a food or beverage according to claim 17, wherein the food or beverage is a reduced salt food or beverage.

19. The taste improving agent according to claim 2 characterized by being a seasoning agent.

20. The taste improving agent according to claim 2 characterized by being a masking agent.

21. A process of making the whey mineral according to claim 1, comprising the steps of:
    separating a demineralized liquid from milk or whey by membrane separation and/or ion exchange to obtain a high mineral liquid (I);
    separating and removing a calcium-phosphate complex from the high mineral liquid (I) to obtain a high mineral liquid (II); and
    concentrating and/or drying the high mineral liquid (II) until a solid content is obtained that is 20% by mass or more.

* * * * *